US010596932B2

(12) United States Patent
Fujiwara et al.

(10) Patent No.: US 10,596,932 B2
(45) Date of Patent: Mar. 24, 2020

(54) APPARATUS FOR MOUNTING CHILD SAFETY SEAT AND SEAT FOR VEHICLE WITH APPARATUS FOR MOUNTING CHILD SAFETY SEAT

(71) Applicant: NHK SPRING CO., LTD., Yokohama-shi (JP)

(72) Inventors: Keiichiro Fujiwara, Yokohama (JP); Ryousuke Tanaka, Yokohama (JP); Masaharu Sanpei, Yokohama (JP)

(73) Assignee: NHK SPRING CO., LTD., Yokohama-shi (JP)

( * ) Notice: Subject to any disclaimer, the term of this patent is extended or adjusted under 35 U.S.C. 154(b) by 0 days.

(21) Appl. No.: 16/016,936

(22) Filed: Jun. 25, 2018

(65) Prior Publication Data

US 2018/0370394 A1 Dec. 27, 2018

(30) Foreign Application Priority Data

Jun. 23, 2017 (JP) .................................. 2017-122866

(51) Int. Cl.
*B60N 2/26* (2006.01)
*B60N 2/28* (2006.01)
*B60N 2/68* (2006.01)

(52) U.S. Cl.
CPC ........... *B60N 2/2893* (2013.01); *B60N 2/286* (2013.01); *B60N 2/2827* (2013.01); *B60N 2/68* (2013.01); *B60N 2205/35* (2013.01)

(58) Field of Classification Search
CPC .... B60N 2/2893; B60N 2/2827; B60N 2/286; B60N 2/68

USPC ........................................................ 297/253
See application file for complete search history.

(56) References Cited

U.S. PATENT DOCUMENTS

| 6,276,754 | B1 * | 8/2001 | Youssef-Agha | B60N 2/28 297/253 X |
| 6,361,115 | B1 * | 3/2002 | Aufrere | B60N 2/2821 297/256.16 X |
| 7,131,693 | B2 * | 11/2006 | Smallwood | B60N 2/286 297/253 |
| 9,718,379 | B2 * | 8/2017 | Wagner | B60N 2/289 |
| 9,827,884 | B2 * | 11/2017 | Susko | B60N 2/2893 |
| 10,220,735 | B1 * | 3/2019 | Nae | B60N 2/2893 |
| 2003/0006641 | A1 * | 1/2003 | Habedank | B60N 2/28 297/463.1 |
| 2013/0313850 | A1 * | 11/2013 | Hawkins | B60N 2/2893 296/65.16 |

(Continued)

FOREIGN PATENT DOCUMENTS

| DE | 102004004376 B3 * | 10/2005 | ........... B60N 2/2893 |
| EP | 2384925 A1 * | 9/2011 | ........... B60N 2/2893 |

(Continued)

*Primary Examiner* — Rodney B White
(74) *Attorney, Agent, or Firm* — Flynn Thiel, P.C.

(57) ABSTRACT

An apparatus for mounting a child safety seat and a seat for a vehicle, which are capable of easing a restriction on a position of the child safety seat on the vehicle seat due to a limited width of the vehicle, so as to enhance the degree of freedom of such a position. At the same time, the apparatus and seat allow mounting of the child safety seat on the vehicle seat in a precise and reliable manner in such a way that the child safety seat can endure an impact load in a longitudinal direction of the vehicle or a lateral direction of the vehicle.

20 Claims, 7 Drawing Sheets

(56) References Cited

U.S. PATENT DOCUMENTS

2017/0349066 A1 * 12/2017 Fujiwara .............. B60N 2/2893

FOREIGN PATENT DOCUMENTS

| FR | 3006951 A1 * | 12/2014 | ........... B60N 2/2893 |
|----|--------------|---------|-------------------------|
| FR | 3013008 A1 * | 5/2015  | ........... B60N 2/2893 |
| JP | 3462160 B2   | 11/2003 | |
| JP | 3690228 B2   | 8/2005  | |

\* cited by examiner

APPARATUS FOR MOUNTING CHILD SAFETY SEAT AND SEAT FOR VEHICLE WITH APPARATUS FOR MOUNTING CHILD SAFETY SEAT

TECHNICAL FIELD

The present invention relates to an apparatus for mounting a child safety seat and a seat for a vehicle with said apparatus for mounting the child safety seat, and, in particular, relates to such an apparatus for mounting a child safety seat and such a seat for a vehicle with said apparatus for mounting a child safety seat which are capable of easing a restriction on arranging said child safety seat on said seat for a vehicle due to a limited width of the vehicle on which said seat for the vehicle is mounted to enlarge degree of freedom on a position of said child safety seat on said seat for a vehicle, while at the same time, capable of mounting said child safety seat on said seat for a vehicle precisely and reliably in such a way that said child safety seat can endure an impact load in a longitudinal direction or a side direction of the vehicle.

BACKGROUND

Conventionally, in a vehicle, an automobile, in particular, the apparatus for mounting the child safety seat has been used in order to mount the child safety seat on the seat for the vehicle. Japanese Patent No. 3462160 and Japanese Patent No. 3690228 each disclose an example of such the apparatus for mounting the child safety seat.

In the apparatus for mounting the child safety seat disclosed in Japanese Patent No. 3462160, a lower bar extending in the widthwise direction of the seat for the vehicle over the entirety of its width is fixed on the seat for the vehicle. A pair of anchor members are fixed on the lower bar, the pair of anchor members are disposed to be spaced apart from each other in the widthwise direction of the seat for the vehicle, in accordance with the width of the seat, and each anchor member includes a pair of leg portions and a locking portion which connects the pair of leg portions and is detachably connected on a fixing hook mounted on the child safety seat. Both ends and an intermediate portion of the lower bar are fixed on a floor panel via a supporting bracket. The supporting bracket at the intermediate portion, in particular, is fixed on the floor panel by utilizing a bracket for a seat frame for the vehicle.

According to such a structure, since not only the ends, but also the intermediate portion of the lower bar on which the pair of anchor members fixing the child safety seat is mounted is supported on the floor panel via the corresponding supporting brackets, even if a light and cheap lower bar is used, the lower bar does not largely deform due to a load from the child safety seat upon a front collision of the vehicle, so that the supporting rigidity for the child safety seat can be secured, and there is no risk of the lower bar being deformed in a case where luggage is loaded on the rear portion of the vehicle is caused to shift forwardly due to the sudden brake of the vehicle, etc. to collide with the lower bar.

In the apparatus for mounting the child safety seat disclosed in Japanese Patent No. 3690228, the lower bar extending in the widthwise direction of the seat for the vehicle over the entirety of its width is fixed on the seat for the vehicle. The pair of anchor members are fixed on the lower bar, each of the pair of anchor members are disposed to be spaced apart from each other in the widthwise direction of the seat for the vehicle, in accordance with the width of the seat, and each anchor member includes a pair of leg portions and the locking portion which connects the pair of leg portions and is detachably connected on a fixing hook mounted on the child safety seat.

In the one anchor member of the pair of anchor members, the left or right leg portion is fixed on the lower bar so as to be partially wound around the lower bar from above or below, while the left or right leg portion is fixed on the lower bar so as to be partially wound around the lower bar from below or above, while on the other hand, in the other anchor member of the pair of anchor members, the left or right leg portion is fixed on the lower bar so as to be partially wound around the lower bar from above or below, while the left or right leg portion is fixed on the lower bar so as to be partially wound around the lower bar from below or above.

According to such a structure, as compared with a structure in which a pair of leg portions in each of the pair of anchor members are fixed on the lower bar so as to be partially wound around the lower bar from above or below, a vertical movement of the fixing hook relative to the lower bar can be reliably restricted, so that the child safety seat can be effectively and reliably prevented from largely declining or overturning.

However, these apparatuses for mounting the child safety seat raise following technical problems.

Firstly, since a case in which the child safety seats are simultaneously or individually mounted on a plurality of seat portions adjacent to each other is not assumed, it is technically difficult to mount the child safety seat simultaneously or individually on the plurality of seat portions adjacent to each other under such an above configuration in which the pair of anchor members are mounted on the lower bar. In addition, if the pair of anchor members are welded on the lower bar in each of the plurality of seat portions, the lower bar can deflect due to the weld heat to make the mounting of the child safety seat on the seat in a precise manner difficult, or, in a small vehicle with a narrow width including a plurality of seat portions, it is technically difficult to mount the child safety seats simultaneously on the plurality of seat portions.

More specifically, as shown in FIG. 8, in Japanese Patent No. 3462160, in a case where the pair of anchor members are welded on the lower bar spaced apart from each other in the widthwise direction of the vehicle in accordance with the width of the seat portion, in each of the plurality of seat portions adjacent to each other, since the pair of leg portions of each pair of anchor members are welded on the same vertical side of the lower bar (lower side in FIG. 8) under the condition that the anchor members are welded on the lower bar by spot welding, in particular, each anchor member can separate from the lower bar due to a narrow welding area upon an exertion of a vertical load on the vehicle. In addition, it is technically difficult to dispose the anchor member at the side of the other seat portion in the one of the seat portions and the anchor member at the side of the one seat portion in the other of the seat portions, close to each other.

While, on the other hand, in Japanese Patent No. 3690228, although the pair of leg portions in each anchor member are welded on the lower bar so as to be partially wound around the lower bar with the one leg portion at the one vertical side and the other leg portion at the other vertical side, it neither suggests nor discloses that the anchor members at the side of the other seat portion in the one of the seat portions and the anchor members at the side of the one seat portion in the other of the seat portions are disposed more closely adjacent to each other.

Secondly, in the seat for the vehicle with the plurality of seat portions adjacent to each other, in a case where a space in the widthwise direction for two seat portions are provided, for instance, it is technically difficult to mount three safety seats for the child on such a space. More specifically, since the width of the child safety seat is narrower than that of the seat portion, the pair of anchor members have been conventionally welded on the lower bar in each of the plurality of seat portions, so that there is a restriction for positioning the anchor members in the widthwise direction of the seat for the vehicle, in a case where a plurality of pairs of anchor members are to be mounted.

SUMMARY

In view of the above technical problems, an object of the present invention is to provide an apparatus for mounting a child safety seat and a seat for a vehicle capable of easing a restriction on a position of the child safety seat on the seat for the vehicle due to a limited width of the vehicle on which the seat for the vehicle is provided, to enhance a degree of freedom on such a position, while at the same time, capable of mounting the child safety seat on the seat for the vehicle in a precise and reliable manner in such a way that the child safety seat can endure an impact load in the longitudinal or the side direction of the vehicle.

In view of the above technical problems, according to an aspect of the invention, there is provided an apparatus for mounting a child safety seat comprising a lower bar which is fixed on a seat for a vehicle and extends in the widthwise direction of the seat for the vehicle, a plurality of pairs of anchor members which are fixed on said lower bar, each pair of anchor members includes a pair of leg portions which are disposed to be spaced apart from each other in the widthwise direction of the seat for the vehicle, and a locking portion which connects said pair of leg portions and is detachably connected to a fixing hook mounted on the child safety seat, in two pairs of anchor members adjacent to each other among said plurality of pairs of anchor members, the one leg portion at the side of the other pair of anchor members, of the pair of leg portions which belong to the one anchor member at the side of the other pair of anchor members, of the one pair of the anchor members is fixed on said lower bar so as to be partially wound around said lower bar from above or below, while, the one leg portion at the side of the one pair of anchor members, of the pair of leg portions which belong to the one anchor member at the side of the one pair of anchor members, of the other pair of the anchor members is fixed on said lower bar so as to be partially wound around said lower bar from below or above, whereby said two pairs of anchor members adjacent to each other among said plurality of pairs of anchor members can be disposed more closely adjacent to each other in the widthwise direction of the seat for the vehicle.

According to the apparatus for mounting the child safety seat, since the lower bar which is fixed on the seat for the vehicle and extends in the widthwise direction of the seat for the vehicle is provided, a plurality of pairs of anchor members are fixed on the lower bar, the two anchor members in each pair of anchor members are disposed to be spaced apart from each other in the widthwise direction of the seat for the vehicle, and each anchor member includes a pair of leg portions and a locking portion which connects the pair of leg portions and is detachably connected to a fixing hook mounted on the child safety seat, the child safety seat can be detachably fixed on the seat for the vehicle via the pair of anchor members.

In a case where the child safety seats are simultaneously mounted on the plurality of seat portions adjacent to each other, since, in two sets of said pair of anchor members adjacent to each other among said plurality of pairs of anchor members, said leg portion of the one pair of anchor members at the side of the other pair of anchor members is fixed on said lower bar so as to be partially wound around said lower bar from above or below, while, said leg portion of the other pair of anchor members at the side of the one pair of anchor members is fixed on said lower bar so as to be partially wound around said lower bar from below or above, said two pairs of anchor members adjacent to each other among said plurality of pairs of anchor members can be disposed more closely adjacent to each other in the widthwise direction of the seat for the vehicle.

In another embodiment of the present invention, said seat for the vehicle includes a plurality of seat portions adjacent to each other, said lower bar extends in the widthwise direction of said seat for the vehicle over the entirety of its width, and said pair of anchor members are fixed on said lower bar in each of said plurality of seat portions adjacent to each other, each pair of anchor members are disposed to be spaced apart from each other in the widthwise direction of said seat for the vehicle, in accordance with the width of the corresponding seat portion, in the anchor member at the side of the other pair of anchor members, of the one pair of anchor members in the one of two adjacent seat portions, the one of said leg portions at the side of the other pair of anchor members is fixed on said lower bar so as to be partially wound around said lower bar from above or below, while, the other of said leg portions at the opposite side is fixed on said lower bar so as to be partially wound around said lower bar from below or above, while, in the anchor member at the side of the one pair of anchor members, of the other pair of anchor members in the other of two adjacent seat portions, the one of said leg portions at the side of the one pair of anchor members is fixed on said lower bar so as to be partially wound around said lower bar from above or below, while, the other of said leg portions at the opposite side is fixed on said lower bar so as to be partially wound around said lower bar from below or above, whereby said anchor member at the side of the other of the two adjacent seats, of the one of the two adjacent seats, and said anchor member at the side of the one of the two adjacent seats, of the other of the two adjacent seats can be disposed more closely adjacent to each other in the widthwise direction of the seat for the vehicle.

According to the apparatus for mounting the child safety seat, even if the child safety seats are simultaneously mounted on the plurality of seat portions adjacent to each other, in two pairs of anchor members adjacent to each other among said plurality of pairs of anchor members, since, with respect to the one pair of anchor members, the one of said leg portions at the side of the other pair of anchor members is fixed on said lower bar so as to be partially wound around said lower bar from above or below, while, the other of said leg portions at the opposite side is fixed on said lower bar so as to be partially wound around said lower bar from below or above, while, with respect to the other pair of anchor members, the one of said leg portions at the side of the one pair of anchor members is fixed on said lower bar so as to be partially wound around said lower bar from above or below, while, the other of said leg portions at the opposite side is fixed on said lower bar so as to be partially wound around said lower bar from below or above, the adjacent leg portions, one of which belongs to the one pair of anchor members in the one seat portion, the other of which belongs to the other adjacent pair of anchor members in the other adjacent seat portion, are fixed on the lower bar by welding at vertically opposite positions of the lower bar, and as a result, said two pairs of anchor members adjacent to each other among the plurality of pairs of anchor members can be disposed more closely adjacent to each other in the widthwise direction of the seat for the vehicle, whereby a restriction on a position of the child safety seat on the seat for the vehicle due to a limited width of the vehicle on which the seat for the vehicle is provided can be eased, while at the same time, the child safety seat can be mounted on the seat for the vehicle in a precise and reliable manner in such a way that the child safety seat can endure an impact load in the longitudinal direction of the vehicle without the lower bar being deflected, even if the two pairs of anchor members adjacent to each other in the widthwise direction of the seat for the vehicle are mounted on the lower bar.

In another embodiment of the present invention, said seat for the vehicle is a rear seat for three users including a right seat portion, a middle seat portion and a left seat portion, and said anchor members and said lower bar are made of metal, and the left leg portion of the anchor member at the left side of the middle seat portion is fixed on said lower bar so as to be partially wound around said lower bar from above or below, while the right leg portion of the anchor member at the left side of the middle seat portion is fixed on said lower bar so as to be partially wound around said lower bar from below or above, and the left leg portion of the anchor member at the middle side of the left seat portion is fixed on said lower bar so as to be partially wound around said lower bar from above or below, while the right leg portion of the anchor member at the middle side of the left seat portion is fixed on said lower bar so as to be partially wound around said lower bar from below or above, whereby said anchor member at the left side of the middle seat portion and said anchor member at the middle side of the left seat portion can be disposed more closely adjacent to each other in the widthwise direction of the vehicle.

In another embodiment of the present invention, said seat for the vehicle is a rear seat for three users including a right seat portion, a middle seat portion and a left seat portion, and said anchor members and said lower bar are made of metal, and the right leg portion of the anchor member at the right side of the middle seat portion is fixed on said lower bar so as to be partially wound around said lower bar from above or below, while the left leg portion of the anchor member at the right side of the middle seat portion is fixed on said lower bar so as to be partially wound around said lower bar from below or above, and the right leg portion of the anchor member at the middle side of the right seat portion is fixed on said lower bar so as to be partially wound around said lower bar from above or below, while the left leg portion of the anchor member at the right side of the middle seat portion is fixed on said lower bar so as to be partially wound around said lower bar from below or above, whereby said anchor member at the right side of the middle seat portion and said anchor member at the middle side of the right seat portion can be disposed more closely adjacent to each other in the widthwise direction of the vehicle.

In another embodiment of the present invention, said locking portion extends along the axial direction of said lower bar, and each of said pair of leg portions extends in the direction crossing the axial direction of said lower portion.

In another embodiment of the present invention, in said pair of anchor members adjacent to each other in the widthwise direction of the vehicle, said leg portion at the side of the other of said pair of anchor members of the one of said pair of anchor members and said leg portion at the side of the one of said pair of anchor members of the other of said pair of anchor members are arranged in an overlapping manner.

In another embodiment of the present invention, each of said pair of leg portions includes an arcuate portion extending in the direction crossing the axial direction of said lower bar along the surface of said lower bar, and said pair of anchor members are welded on the surface of said lower bar by means of an arc welding via said arcuate portions.

In another embodiment of the present invention, each of said pair of leg portions includes a straight portion extending in the direction crossing the axial direction of said lower bar, and said pair of anchor members are welded on the surface of said lower bar by means of a spot welding via said straight portions.

In another embodiment of the present invention, said seat for the vehicle includes a rectangular seat back frame which vertically extends, and said lower bar is fixed on said floor panel vis a bracket for a seat frame connected to said rectangular seat back.

In another embodiment of the present invention, said bracket for said seat frame is provided so as to fix and support said intermediate lower portion in the widthwise direction of said rectangular seat back frame, on said floor panel, and said lower bar includes a first portion which extends between the one of said lower end corner portion and said intermediate lower portion, of said rectangular seat back frame and a second portion which extends between the other of said lower end corner portion and said intermediate lower portion, of said rectangular seat back frame, whereby each of said first and second portions is individually fixed on said intermediate lower portion of said bracket for said seat frame.

In another embodiment of the present invention, said bracket for said seat frame is provided so as to fix and support each of said lower end corner portions in the widthwise direction of said rectangular seat back frame, on said floor panel, and a penetrated hole through which said lower bar extends is provided on the bracket for said seat frame.

In another embodiment of the present invention, a lower side portion of said rectangular seat back frame extending in the widthwise direction of the vehicle is utilized as said lower bar.

In another embodiment of the present invention, the seat for the vehicle comprises the apparatus for mounting the child safety seat.

DETAILED DESCRIPTION

An embodiment of the apparatus for mounting the child safety seat of the present invention will be described in detail by exemplifying a case in which the child safety seat is mounted on a rear seat for a vehicle for three users, with reference to the drawings.

Figure 1:
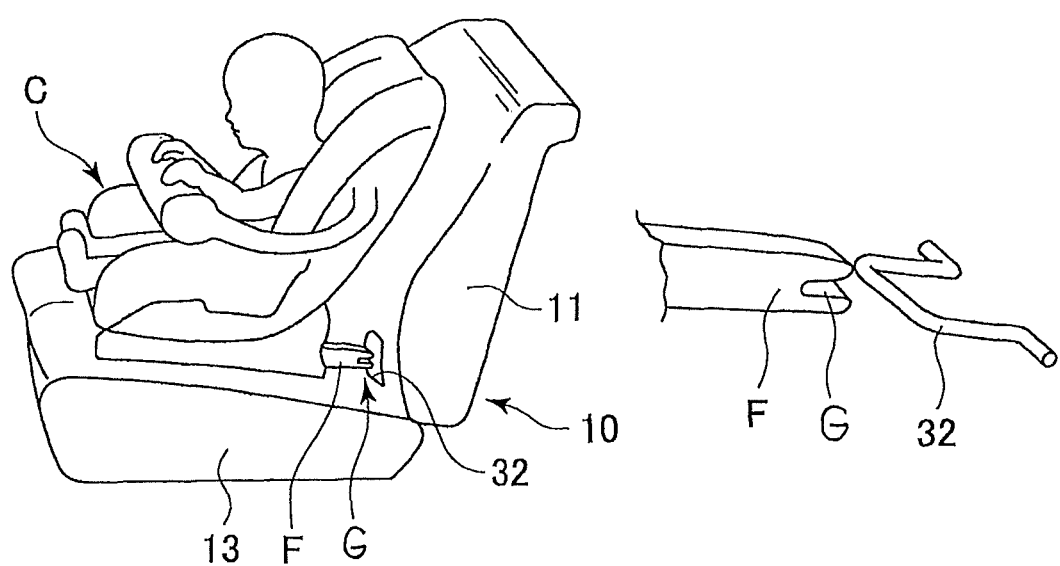
FIG. 1 is a general perspective view showing a situation in which the child safety seat C is mounted on the seat for the vehicle by means of the apparatus for mounting the child safety seat according to the present invention.
Figure 1A:
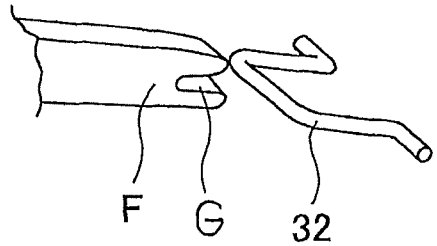
FIG. 1A is a detail view of FIG. 1.
Figure 2:
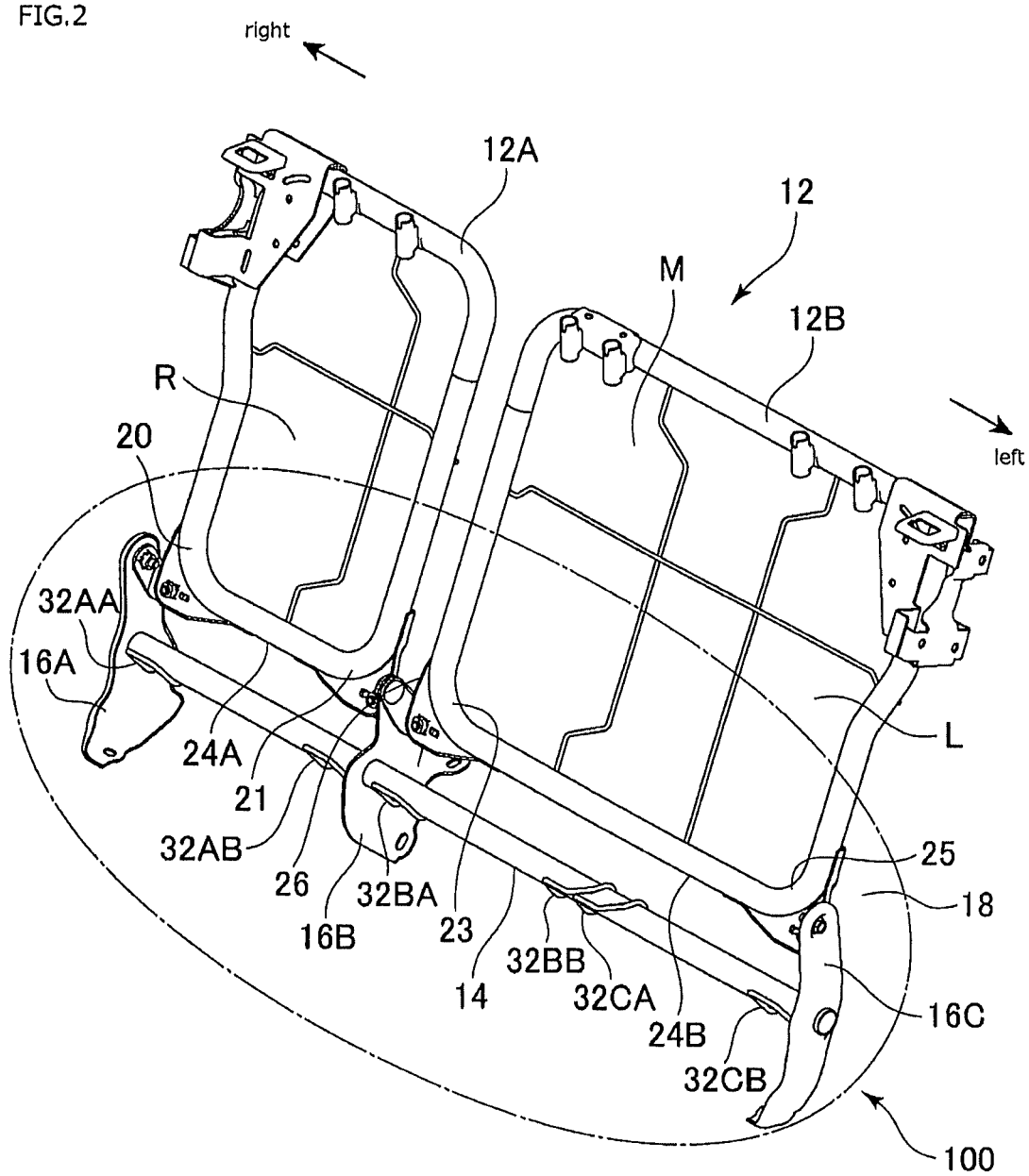
FIG. 2 is a general perspective view showing a situation in which the apparatus for mounting the child safety seat is mounted on the seat frame for the vehicle according to the present invention.
Figure 3:
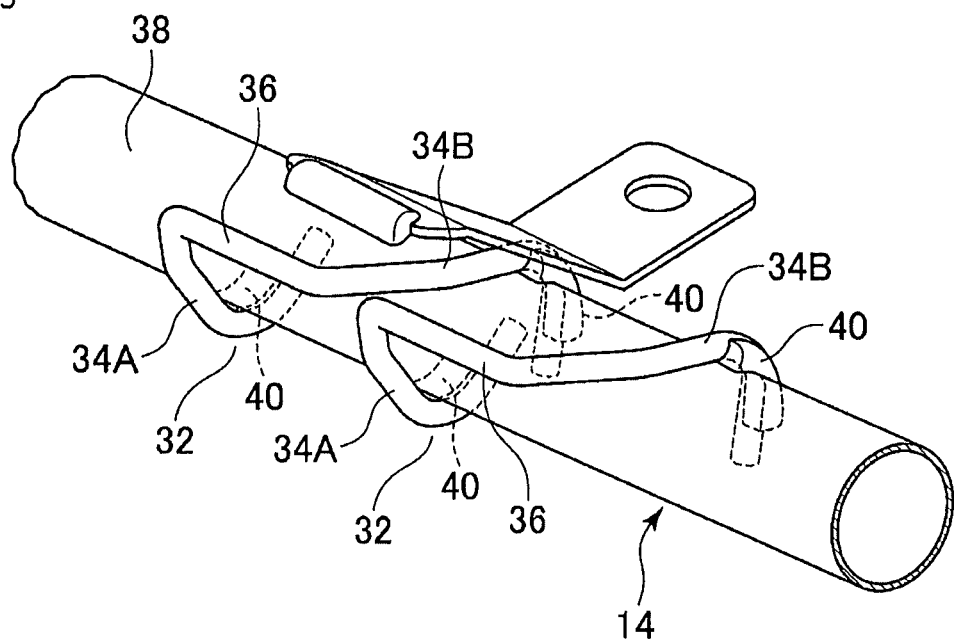
FIG. 3 is a partial general perspective view showing a situation in which the pair of anchor members are fixed on the lower bar 14 according to the present invention.

As shown in FIGS. 1 and 2, the rear seat 10 for the vehicle for three users comprises a seat back 11 for the vehicle and a seat cushion 13 for the vehicle. The seat cushion 13 for the vehicle supports a hip portion and a thigh portion of a user, while the seat back 11 for the vehicle supports a back portion of a user. Each of the seat back 11 for the vehicle and the seat cushion 13 for the vehicle includes a seat frame structure 12, a pad (not shown) so as to cover the entire seat frame structure 12, and a skin sheet (not shown) in a bag form so as to entirely cover the seat frame structure 12 and the pad.

The rear seat 10 for the vehicle is a rear seat for three users with a right seat portion R, a middle seat portion M and a left seat portion L. The rear seat 10 for the vehicle includes a rectangular seat back frame 12 which is vertically oriented and is formed by a seat back frame portion for the right seat portion R, a seat back frame portion for the middle seat portion M, a seat back frame portion for the left seat portion L being connected in a planar form so as to be shaped into a rectangle as a whole.

A bracket for the seat frame via which the rectangular seat back frame 12 is fixed on the floor panel 18 is provided.

More specifically, a right lower corner portion 20 of the rectangular seat back frame 12A for the right seat portion R, a left lower corner portion 21 of the rectangular seat back frame 12A for the right seat portion R, a right lower corner portion 23 of the middle seat portion M and the rectangular seat back frame 12B for the left seat portion L, and a left lower corner portion 25 of the rectangular seat back frame 12B for the left seat portion L are fixed on the brackets 16A, 16B and 16C, respectively.

A pair of left and right fixing hooks of the ISO-FIX type are fixed on a lower end portion of a rear face of the child safety seat C. The left and right fixing hooks (one fixing hook F is shown in FIG. 1) are laterally spaced apart from each other, and each includes a groove G, which groove extends substantially horizontally and is rearwardly open. As discussed further below, each fixing hook F of the child safety seat C is detachably connected to an anchor member 32.

Turning to the apparatus for mounting the child safety seat, as shown in FIG. 2, the apparatus 100 includes a lower bar 14 which is fixed on the rear seat 10 for the vehicle and extends in the widthwise direction of the rear seat 10 over its entire width. The lower bar 14 is fixed on the floor panel 18 via the brackets 16A, 16B, 16C for the seat frame, each of which is connected to the rectangular seat back frame 12. A penetrated hole (not shown) through which the lower bar 14 extends is provided on each of the brackets 16A, 16B, 16C for the seat frame.

A case of the intermediate bracket 16B is now explained as an example, with respect to the configuration in which the lower bar 14 is fixed on the seat back frame portion via the brackets 16A, 16B, 16C.

The bracket 16B for the seat frame is fixed in the intermediate position in the widthwise direction on the floor panel 18 via a bolt (not shown), and the bracket 16B for the seat frame and the lower bar 14 are connected to each other with the lower bar 14 abutting against the bracket 16B from behind.

Alternatively, lower sides 24A, 24B extending in the widthwise direction of the rectangular seat back frame 12 may be utilized as the lower bar 14. This allows the cost for the apparatus 100 for mounting the child safety seat to be reduced without a need to newly provide the lower bar 14.

As shown in FIGS. 3 to 6, pairs of the anchor members 32 are fixed on the lower bar 14 in each of the plurality of seat portions adjacent to each other.

More specifically, a pair 32A of anchor members 32AA, 32AB, a pair 32B of anchor members 32BA, 32BB, and a pair 32C of anchor members 32CA, 32CB, are provided on the right seat portion R, the middle seat portion M, and the left seat portion L, respectively. Each anchor member 32 is formed by bending a metal solid bar with a circular cross section into a predetermined shape, for instance.

The anchor members 32 are fixed on the lower bar 14 by welding, and the pair of anchor members 32 are disposed to be spaced apart from each other in the widthwise direction of the rear seat 10 for the vehicle, in accordance with the width of the corresponding seat portion, in such a way that the distance between the one anchor member 32 and the other anchor member 32 are set to be equal to that between the left and right fixing hooks F. Each pair of anchor members 32 are positioned between a rear end portion of the seat cushion 13 of the rear seat 10 for the vehicle and the lower end portion of the seat back 11 of the rear seat 10 for the vehicle, and each anchor member 32 is shaped into a substantially C-shape and opens rearwardly in a case where it is seen from above.

Each of the anchor members 32 includes a pair of leg portions 34A, 34B and a locking portion 36 which connects the pair of leg portions 34A, 34B and is detachably connected to the fixing hook F mounted on the child safety seat C. The locking portion 36 extends along the axial direction of the lower bar 14, and each leg portion 34A, 34B extends in a direction crossing the axial direction of the lower bar 14.

In each pair of anchor members 32, the locking portions 36 are adapted to be inserted into the grooves G of the left and right fixing hooks F, respectively, whereby the fixing hooks F are detachably fixed on the corresponding anchor members 32.

More specifically, the left leg portion 34B of the anchor member 32BB at the left side of the middle seat portion M is fixed on the lower bar 14 by welding so as to be partially wound around the lower bar 14 from above, while the right leg portion 34A of the anchor member 32BB at the left side of the middle seat portion M is fixed on the lower bar 14 by welding so as to be partially wound around the lower bar 14 from below, and the left leg portion 34B of the anchor member 32CA at the middle side of the left seat portion L is fixed on the lower bar 14 by welding so as to be partially wound around the lower bar 14 from above, while the right leg portion 34A of the anchor member 32CA at the middle side of the left seat portion L is fixed on the lower bar 14 by welding so as to be partially wound around the lower bar 14 from below. Since the two adjacent leg portions 34B, 34A, one of which belongs to the pair of anchor members 32 in one seat and the other of which belongs to another pair of anchor members 32 (adjacent to the former pair of anchor members 32) in another seat adjacent to the former seat, are fixed on the lower bar 14 in such a way that one of the leg two adjacent portions is fixed at one vertical side of the lower bar 14 and the other of the two adjacent leg portions is fixed at the vertically opposite side of the lower bar 14, the anchor member 32BB at the left side of the middle seat portion M and the anchor member 32CA at the middle side of the left seat portion L can be disposed more closely adjacent to each other in the widthwise direction of the vehicle.

In particular, with respect to the two anchor members 32 oriented close to each other in the widthwise direction of the vehicle (the anchor member 32BB at the left side of the middle seat portion M and the anchor member 32CA at the middle side of the left seat portion L), these anchor members can be arranged closer to each other in the widthwise direction of the vehicle since the leg portion 34B of the anchor member 32BB located at the side of the anchor member 32CA and the leg portion 34A of the anchor member 32CA located at the side of the anchor member 32BB are disposed so as to be overlapped with each other.

Alternatively, in a case where the bracket 16B for the seat frame is omitted, the right leg portion 34A of the anchor member 32BA at the right side of the middle seat portion M may be fixed on the lower bar 14 by welding so as to be partially wound around the lower bar 14 from above, while, the left leg portion 34B of the anchor member 32BA at the right side of the middle seat portion M may be fixed on the lower bar 14 by welding so as to be partially wound around the lower bar 14 from below, and the right leg portion 34A of the anchor member 32AB at the middle side of the right seat portion R may be fixed on the lower bar 14 by welding so as to be partially wound around the lower bar 14 from above, while, the left leg portion 34B of the anchor member 32AB at the middle side of the right seat portion R may be fixed on the lower bar 14 by welding so as to be partially wound around the lower bar 14 from below, whereby the anchor member 32BA at the right side of the middle seat portion M and the left anchor member 32AB at the middle side of the right seat portion R may be arranged close to each other in the widthwise direction of the vehicle.

In this regard, in the pair of anchor members 32, the right leg portion 34A and the left leg portion 34B may be fixed on the lower bar 14 by welding so as to be partially wound around the lower bar 14, not only from above or below, respectively, but also from below or above, respectively.

More specifically, in the pair of anchor members 32, a tip end portion of the leg portion 34A is fixed on the lower bar 14 so as to be wound around the lower bar 14 over a peripheral angle range between 90° and 180°, from above or below, while, a tip end portion of the leg portion 34B is fixed on the lower bar 14 so as to be wound around the lower bar 14 over a peripheral angle range between 90° and 180°, from below or above.

Figure 5:
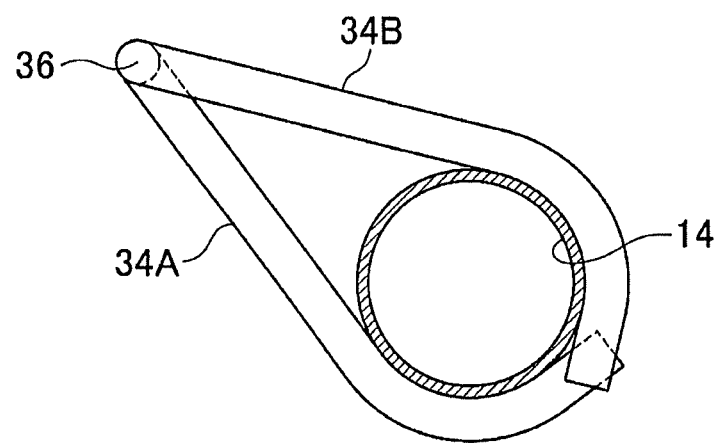
FIG. 5 is a partial general cross-sectional view showing a situation in which the pair of anchor members are fixed on the lower bar 14, as seen from the axial direction of the lower bar 14 in FIG. 3.
Figure 6:
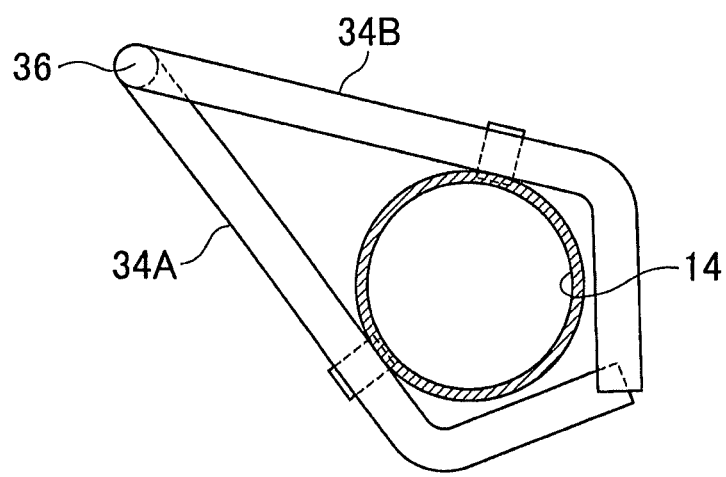
FIG. 6 is a partial general cross-sectional view showing a situation in which the pair of anchor members are fixed on the lower bar 14, as seen from the axial direction of the lower bar 14 in FIG. 4.

As shown in FIGS. 5 and 6, the pair of leg portions 34A, 34B are formed into a V-shape, which V-shape has an opening portion that faces rearwardly, and which V-shape has a tip end portion that protrudes forwardly from the lower bar 14, when they are seen from the lateral direction of the vehicle.

Each of the pair of leg portions 34A, 34B includes an arcuate portion 40 extending in the direction crossing the axial direction of the lower bar 14 along a surface 38 of the lower bar 14, and the pair of anchor members 32 are welded on the surface 38 of the lower bar 14 by arc welding via the arcuate portion 40.

Figure 4:
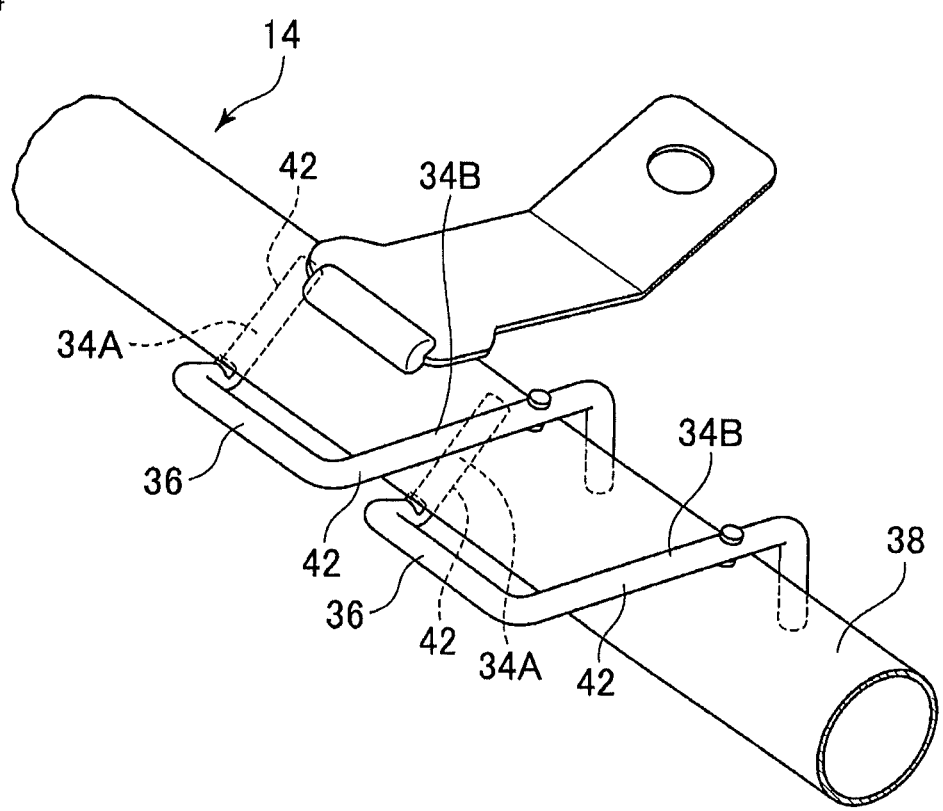
FIG. 4 is a general perspective view showing another situation in which the pair of anchor members are fixed on the lower bar 14 according to the present invention.

Alternatively, as shown in FIGS. 4 and 6, each of the leg portions 34A, 34B includes a straight portion 42 extending in the direction crossing the axial direction of the lower bar 14, and the anchor members 32 are welded on the surface 38 of the lower bar 14 by spot welding via the straight portions 42. According to this welding process, as compared with arc welding, the welding length can be shortened, so that an influence of the welding heat can be further reduced.

In this regard, the length of the winding of the leg portion 34A around the lower bar 14 may be determined, in view of the leg portion 34A being kept locked against the lower bar upon an exertion of a rearward or the forward load thereon, while the length of the welding of the leg portion 34A on the lower bar 14 may be determined, in view of the leg portion 34A being kept fixed on the lower bar 14 upon an exertion of the rearward or the forward load thereon, or the lateral load thereon, so that the winding length and the welding length do not necessarily have to be the same.

Still alternatively, the bracket 16B for the seat frame is provided so as to fix and support an intermediate lower portion 26 in the widthwise direction of the rectangular seat back frame 12 on the floor panel 18, and the lower bar 14 includes a first portion which extends between the one of the lower end corder portion 20 and the intermediate lower portion 26 of the rectangular seat back frame 12, and a second portion which extends between the other of the lower end corner portion 20 and the intermediate lower portion 26 of the rectangular seat back frame 12, whereby each of the first and second portions may be individually fixed on respective opposed surfaces of the bracket 16B for the seat frame. For instance, the first portion may correspond to the right or left seat portion R, L, and the second portion may correspond to the middle seat portion M and the left or right seat portion.

Now, a technical effect of the apparatus for mounting the child safety seat C on with the above structure is explained, including a method of mounting the child safety seat C on the seat for the vehicle.

In the seat 10 for the vehicle with a plurality of seat portions adjacent to each other on which the lower bar 14 extending in the widthwise direction of the vehicle over the entirety of its width is provided, the method of mounting the child safety seat C on the seat for the vehicle includes a step of selecting a plurality of seat portions on which the child safety seats C are to be mounted, and a step of fixing a pair of anchor members 32 on the lower bar 14 by welding, in accordance with each of the selected plurality of seat portions adjacent to each other.

For instance, the positioning of the pair of anchor members 32 on the lower bar 14 by welding is determined by selecting the middle seat portion M and the left seat portion L adjacent to each other on each of which the child safety seat C is to be mounted.

Since each pair of anchor members 32 are disposed to be spaced apart from each other in the widthwise direction of the rear seat 10 for the vehicle in accordance with the width of the corresponding seat portion, and since each anchor member 32 includes the pair of leg portions 34A, 34B and the locking portion 36 (which connects the pair of leg portions 34A, 34B and which locking portion 36 is detachably connected to the child safety seat C), the positioning of the pair of anchor members 32 on the lower bar 14 may be carried out by passing the lower bar 14 from its one end between the pair of leg portions 34A, 34B of each anchor member 32 in the axial direction of the lower bar 14 to position the pair of anchor members 32 at a longitudinal position of the lower bar 14, and rotating the anchor members 32 about the axial direction of the lower bar 14.

Then, in the two pairs of anchor members 32 adjacent to each other, the leg portion of the anchor member (of one pair of anchor members) located at the side of the other pair of anchor members is fixed on the lower bar 14 so as to be partially wound around the lower bar 14 from above or below, while, the leg portion of the anchor member (of the other pair of anchor members 32) located at the side of the one pair of anchor members is fixed on the lower bar 14 so as to be partially wound around the lower bar 14 from below or above, whereby the two pairs of anchor members 32 adjacent to each other are disposed more closely adjacent to each other in the widthwise direction of the seat for the vehicle.

The mounting of the apparatus for mounting the child safety seat C on the seat for the vehicle is completed by fixing the lower bar 14 on which the anchor members 32 are welded on the rear seat 10 for the vehicle via the brackets 16A, 16B, 16C for the seat frame.

According to the apparatus for mounting the child safety seat C, in the seat 10 for the vehicle with a plurality of seat portions adjacent to each other, since the lower bar 14 is provided which is fixed on the seat 10 for the vehicle and extends in the widthwise direction of the seat 10 for the vehicle over the entirety of its width, a plurality of pairs of anchor members 32 are fixed on the lower bar 14, the two anchor members 32 in each pair of anchor members are disposed to be spaced apart from each other in the widthwise direction of the seat 10 for the vehicle, in accordance with the width of the corresponding seat portion on which the child safety seat C is to be mounted, and are fixed on the lower bar 14 by welding, the child safety seat C can be detachably fixed on the seat portion via the corresponding pair of anchor members 32.

More specifically, in a case where the child safety seat C is fixed on the seat cushion 13 for the vehicle, firstly, the child safety seat C is moved rearwardly along a surface of the seat cushion 13 for the vehicle, whereby the locking portions 36 of the pair of anchor members 32 are inserted into the grooves G of the left and right fixing hooks F, respectively, and thus, the child safety seat C is fixed on the seat cushion 13 for the vehicle by means of a seat belt, or a dedicated belt (not shown).

According to the apparatus for mounting the child safety seat C, even if the child safety seats C are simultaneously mounted on the plurality of seat portions adjacent to each other, in two pairs of anchor members 32 adjacent to each other among said plurality of pairs of anchor members 32, since, with respect to the one pair of anchor members 32, the one of said leg portions at the side of the other pair of anchor members 32 is fixed on said lower bar 14 so as to be partially wound around said lower bar 14 from above or below, while, the other of said leg portions at the opposite side is fixed on said lower bar 14 so as to be partially wound around said lower bar 14 from below or above, while, with respect to the other pair of anchor members 32, the one of said leg portions at the side of the one pair of anchor members 32 is fixed on said lower bar 14 so as to be partially wound around said lower bar 14 from above or below, while, the other of said leg portions at the opposite side is fixed on said lower bar 14 so as to be partially wound around said lower bar 14 from below or above, the adjacent leg portions, one of which belongs to the one pair of anchor members 32 in the one seat portion, the other of which belongs to the other adjacent pair of anchor members 32 in the other adjacent seat portion, are fixed on the lower bar 14 by welding at vertically opposite positions of the lower bar 14. As a result, said two pairs of anchor members 32 adjacent to each other among the plurality of pairs of anchor members 32 can be disposed more closely adjacent to each other in the widthwise direction of the seat for the vehicle, whereby a restriction on a position of the child safety seat C on the seat 10 for the vehicle due to a limited width of the vehicle on which the seat 10 for the vehicle is provided can be eased, while at the same time, the child safety seat C can be mounted on the seat 10 for the vehicle in a precise and reliable manner in such a way that the child safety seat C can endure an impact load in the longitudinal direction of the vehicle without the lower bar 14 being deflected, even if the two pairs of anchor members 32 adjacent to each other in the widthwise direction of the seat 10 for the vehicle are mounted on the lower bar 14.

Figure 7:
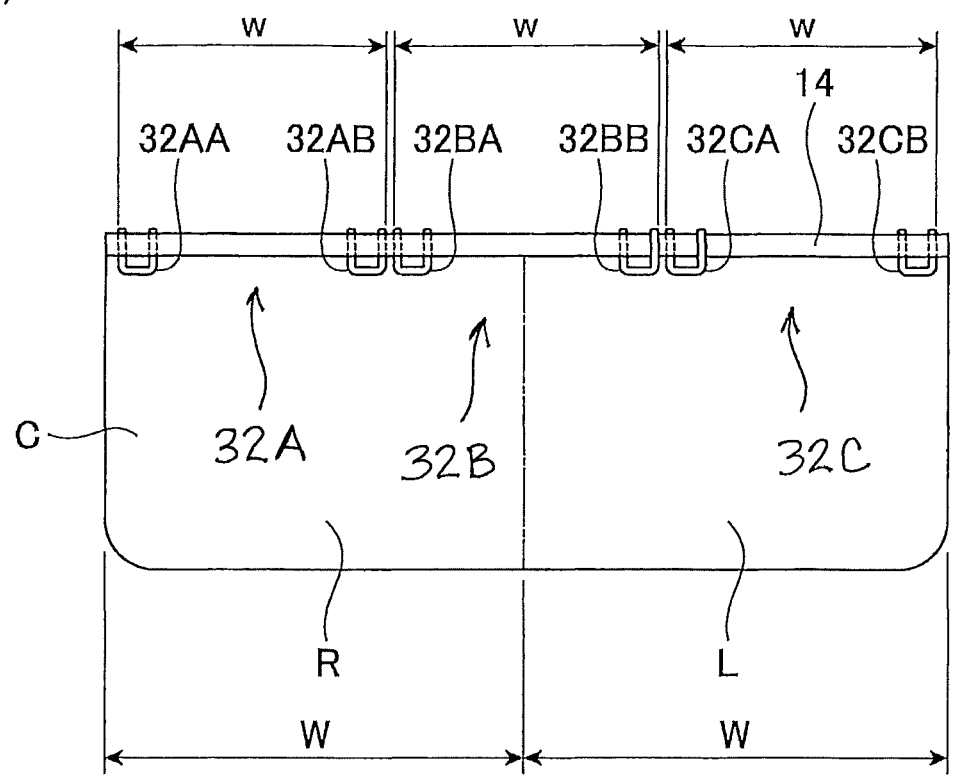
FIG. 7 is a general view showing an alternative embodiment of a situation in which the pair of anchor members are fixed on a lower bar 14.
Figure 8:
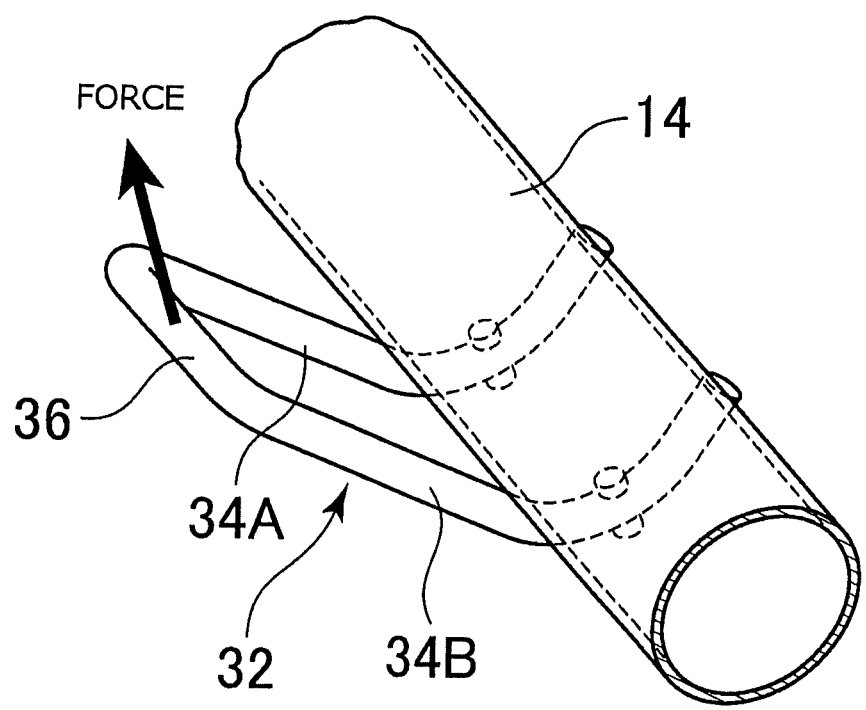
FIG. 8 is a general perspective view showing a situation in which the pair of anchor members are fixed on the lower bar 14 in a conventional apparatus for mounting the child safety seat.

Alternatively, since the pair of anchor members do not have to be provided on each of the plurality of seat portions adjacent to each other, as shown in FIG. 7, in the two seat portions (the right seat portion R and the left seat portion L), three pairs of anchor members 32 may be fixed on the lower bar 14 by welding, based on the fact that the width w of the child safety seat C is narrower than that of the seat portion W. In such a case, since there are two pairs of anchor members 32 adjacent to each other in the widthwise direction of the vehicle, in the three pairs of anchor members 32, the anchor member 32AB of the pair of anchor members 32A and the anchor member 32BA of the pair of anchor members 32B adjacent to the pair of anchor members 32A, and the anchor member 32BB of the pair of anchor members 32B and the anchor member 32CA of the pair of anchor members 32C adjacent to the pair of anchor members 32B may be disposed more closely adjacent to each other by adopting the reversely vertical relationship between the adjacent leg portions 34A, 34B on the configuration in which the adjacent leg portions 34A, 34B are wound around the lower bar 14.

As described above, the preferred embodiment of the present invention was described in detail, however, it is evident that those skilled in the art could modify or change the embodiment in various manners without departing from the scope of the present invention.

For instance, in this embodiment, the rectangular seat back frame 12 for the left seat portion and the rectangular seat back frame 12 for the middle and right seat portions are connected to each other in a planar form, however, an auxiliary bar may be provided so as to vertically extend at the border line portion between the left and the middle seat portions, in the rectangular seat back frame 12.

For instance, in this embodiment, the child safety seat C is mounted on the rear seat for three users, however, the child safety seats C may be simultaneously mounted on the seat portions adjacent to each other, or the child safety seat C may be mounted on either of the seat portions adjacent to each other, so long as the child safety seat C is mounted on the seat for the vehicle with a plurality of seat portions adjacent to each other.

For instance, in this embodiment, the lower bar 14 is fixed on the seat for the vehicle via a supporting bracket, however, the lower bar 14 may be directly fixed on the seat for the vehicle without using the supporting bracket, so long as the child safety seat C is reliably kept fixed on the seat even when an impact load in the longitudinal direction of the vehicle is exerted on the child safety seat C.

For instance, in this embodiment, the pair of anchor members are made of a hollow pipe with a circular cross section, however, a solid member with a rectangular cross section may be adopted.

For instance, in this embodiment, the fixing hook is detachably fixed on the locking portion via the groove, however, the fixing hook may be detachably fixed on the corresponding locking portion by another locking configuration.

What is claimed is:

1. An apparatus for mounting a child safety seat in a vehicle, said apparatus comprising:
a lower bar configured for fixation on a vehicle seat so as to extend in a widthwise direction thereof;
a plurality of anchor members fixed to said lower bar, each said anchor member having a pair of leg portions disposed in spaced-apart relation with one another in the widthwise direction and a locking portion interconnecting said leg portions and configured for detachable connection to a fixing hook of a child safety seat, said anchor members being disposed in pairs along said lower bar, one of said pairs being a first pair of anchor members and another of said pairs being a second pair of anchor members, said first pair of anchor members and said second pair of anchor members being disposed sidewardly adjacent one another in the widthwise direction;
said first pair of anchor members including first and second said anchor members disposed in spaced-apart relation with one another in the widthwise direction, and said second pair of anchor members including third and fourth said anchor members disposed in spaced-apart relation with one another in the widthwise direction, said second and third anchor members being disposed sidewardly adjacent one another in the widthwise direction, one of said leg portions of said second anchor member being fixed to said lower bar by being partially wound around one of an upper portion of said lower bar or a lower portion of said lower bar, one of said leg portions of said third anchor member being fixed to said lower bar by being partially wound around the other of said upper portion of said lower bar or said lower portion of said lower bar, said one leg portion of said second anchor member and said one leg portion of said third anchor member being disposed closely sidewardly adjacent one another to permit close sideward positioning of said first and second pairs of anchor members with one another in the widthwise direction.

2. The apparatus according to claim 1, wherein said second and third anchor members are disposed between said first and fourth anchor members in the widthwise direction.

3. The apparatus according to claim 2, wherein said one leg portion of said second anchor member is a first inner leg portion and the other leg portion of said second anchor member is a second outer leg portion, said one leg portion of said third anchor member is a first inner leg portion and the other leg portion of said third anchor member is a second outer leg portion, said first inner leg portions of said second and third anchor members being disposed immediately sidewardly adjacent one another in the widthwise direction and between said second outer leg portions of said second and third anchor members.

4. The apparatus according to claim 3, wherein said vehicle seat comprises a plurality of seat portions disposed adjacent to one another in the widthwise direction and said lower bar extends in the widthwise direction over an entirety of a width of said vehicle seat, said first and second anchor members of said first pair of anchor members being disposed in spaced-apart relation with one another in the widthwise direction at a distance corresponding to a width of a first of said seat portions, said third and fourth anchor members of said second pair of anchor members being disposed in spaced-apart relation with one another in the widthwise direction at a distance corresponding to a width of a second of said seat portions, said second outer leg portion of said second anchor member being fixed to said lower bar by being partially wound around said other of said upper portion of said lower bar or said lower portion of said lower bar, and said second outer leg portion of said third anchor member being fixed to said lower bar by being partially wound around said one of the upper portion of said lower bar or said lower portion of said lower bar.

5. The apparatus according to claim 4, wherein said vehicle seat comprises a rear vehicle seat configured for three users, said plurality of seat portions comprises a right seat portion, a left seat portion and a middle seat portion disposed between said right and left seat portions, each said anchor member and said lower bar being constructed of metal, said first seat portion corresponding to said middle seat portion and said second seat portion corresponding to said left seat portion, said first anchor member being disposed at a right side of said middle seat portion and said second anchor member being disposed at a left side of said middle seat portion, said third anchor member being disposed at a right side of said left seat portion and said fourth anchor being disposed at a left side of said left seat portion.

6. The apparatus according to claim 4, wherein said vehicle seat comprises a rear vehicle seat configured for three users, said plurality of seat portions comprises a right seat portion, a left seat portion and a middle seat portion disposed between said right and left seat portions, each said anchor member and said lower bar being constructed of metal, said first seat portion corresponding to said middle seat portion and said second seat portion corresponding to said right seat portion, said first anchor member being disposed at a left side of said middle seat portion and said second anchor member being disposed at a right side of said middle seat portion, said third anchor member being disposed at a left side of said right seat portion and said fourth anchor member being disposed at a right side of said right seat portion.

7. The apparatus according to claim 3, wherein said lower bar defines an axis and each said locking portion extends along a direction of the axis, and each of said leg portions extends transversely to the axis.

8. The apparatus according to claim 7, wherein said first inner leg portions of said second and third anchor members are disposed in vertically overlapping relation with one another.

9. The apparatus according to claim 7, wherein each said leg portion of each of said anchor members comprises an arcuate portion extending transversely to the axis and along a surface of said lower bar, said arcuate portions being arc welded to the respective said surfaces of said lower bar.

10. The apparatus according to claim 7, wherein each said leg portion of each of said anchor members comprises a straight portion extending transversely to the axis, each of said straight portions being disposed closely adjacent a surface of said lower bar and being spot welded to the respective said surface of said lower bar.

11. The apparatus according to claim 3, wherein said vehicle seat comprises a rectangular seat back frame oriented substantially vertically and a bracket arrangement connected thereto, said bracket arrangement being disposed to fix said lower bar to a vehicle floor panel.

12. The apparatus according to claim 11, wherein said seat back frame includes first and second lower end corner frame portions and an intermediate lower frame portion, and said bracket arrangement is disposed and configured to fix and support said intermediate lower frame portion in a widthwise direction of said seat back frame on the vehicle floor panel, said lower bar includes a first lower bar portion extending between said first lower end corner frame portion and said intermediate lower frame portion, and a second lower bar portion extending between said second lower end corner frame portion and said intermediate lower frame portion, and each of said first and second portions of said lower bar is individually fixed to said intermediate lower frame portion of said seat back frame.

13. The apparatus of claim 12, wherein said bracket arrangement includes a first bracket disposed to fix said first lower end corner frame portion to the vehicle floor panel, a second bracket disposed to fix said second lower end corner frame portion to the vehicle floor panel and a third bracket disposed between said first and second brackets and disposed to fix said intermediate lower frame portion to the vehicle floor panel, and each of said first bracket, said second bracket and said intermediate bracket includes a through hole through which said lower bar extends.

14. The apparatus of claim 11, wherein said lower bar forms a lower end portion of said seat back frame.

15. A vehicle seat arrangement comprising:
a vehicle seat having a width defining a widthwise direction, said seat comprising an apparatus for mounting a child safety seat, said apparatus comprising:
a lower bar extending in the widthwise direction;
a plurality of anchor members fixed to said lower bar, each said anchor member having a pair of leg portions disposed in spaced-apart relation with one another in the widthwise direction and a locking portion interconnecting said leg portions and configured for detachable connection to a fixing hook of a child safety seat, said anchor members being disposed in pairs along said lower bar, one of said pairs being a first pair of anchor members and another of said pairs being a second pair of anchor members, said first pair of anchor members and said second pair of anchor members being disposed sidewardly adjacent one another in the widthwise direction;
said first pair of anchor members including first and second said anchor members disposed in spaced-apart relation with one another in the widthwise direction, and said second pair of anchor members including third and fourth said anchor members disposed in spaced-apart relation with one another in the widthwise direction, said second and third anchor members being disposed sidewardly adjacent one another in the widthwise direction, one of said leg portions of said second anchor member being fixed to said lower bar by being partially wound around one of an upper portion of said lower bar or a lower portion of said lower bar, one of said leg portions of said third anchor member being fixed to said lower bar by being partially wound around the other of said upper portion of said lower bar or said lower portion of said lower bar, said one leg portion of said second anchor member and said one leg portion of said third anchor member being disposed closely sidewardly adjacent one another to permit close sideward positioning of said first and second pairs of anchor members with one another in the widthwise direction.

16. The vehicle seat arrangement according to claim 15, wherein said second and third anchor members are disposed between said first and fourth anchor members in the widthwise direction.

17. The vehicle seat arrangement according to claim 16, wherein said one leg portion of said second anchor member is a first inner leg portion and the other leg portion of said second anchor member is a second outer leg portion, said one leg portion of said third anchor member is a first inner leg portion and the other leg portion of said third anchor member is a second outer leg portion, said first inner leg portions of said second and third anchor members being disposed immediately sidewardly adjacent one another in the widthwise direction and between said second outer leg portions of said second and third anchor members.

18. The vehicle seat arrangement according to claim 17, further including a plurality of seat portions disposed adjacent to one another in the widthwise direction and said lower bar extends in the widthwise direction over an entirety of a width of said seat, said first and second anchor members of said first pair of anchor members being disposed in spaced-apart relation with one another in the widthwise direction at a distance corresponding to a width of a first of said seat portions, said third and fourth anchor members of said second pair of anchor members being disposed in spaced-apart relation with one another in the widthwise direction at a distance corresponding to a width of a second of said seat portions, said second outer leg portion of said second anchor member being fixed to said lower bar by being partially wound around said other of said upper portion of said lower bar or said lower portion of said lower bar, and said second outer leg portion of said third anchor member being fixed to said lower bar by being partially wound around said one of the upper portion of said lower bar or said lower portion of said lower bar.

19. The vehicle seat arrangement according to claim 18, wherein said seat comprises a rear vehicle seat configured for three users, said plurality of seat portions comprising a right seat portion, a left seat portion and a middle seat portion disposed between said right and left seat portions, each said anchor member and said lower bar being constructed of metal, said first seat portion corresponding to said middle seat portion and said second seat portion corresponding to said left seat portion, said first anchor member being disposed at a right side of said middle seat portion and said second anchor member being disposed at a left side of said middle seat portion, said third anchor member being disposed at a right side of said left seat portion and said fourth anchor being disposed at a left side of said left seat portion.

20. The vehicle seat arrangement according to claim 18, wherein said seat comprises a rear vehicle seat configured for three users, said plurality of seat portions comprising a right seat portion, a left seat portion and a middle seat portion disposed between said right and left seat portions, each said anchor member and said lower bar being constructed of metal, said first seat portion corresponding to said middle seat portion and said second seat portion corresponding to said right seat portion, said first anchor member being disposed at a left side of said middle seat portion and said second anchor member being disposed at a right side of said middle seat portion, said third anchor member being disposed at a left side of said right seat portion and said fourth anchor member being disposed at a right side of said right seat portion.

* * * * *